No. 660,346.  
J. F. SWINNERTON.  
GAS WASHER.  
(Application filed June 28, 1900.)  
Patented Oct. 23, 1900.

(No Model.)

Witnesses:  
Inventor  
James F. Swinnerton  
By his Attorneys

THE NORRIS PETERS CO., PHOTO-LITHO., WASHINGTON, D. C.

UNITED STATES PATENT OFFICE.

JAMES F. SWINNERTON, OF NEW YORK, N. Y.

GAS-WASHER.

SPECIFICATION forming part of Letters Patent No. 660,346, dated October 23, 1900.

Original application filed January 6, 1899, Serial No. 701,366. Divided and this application filed June 28, 1900. Serial No. 21,901. (No model.)

*To all whom it may concern:*

Be it known that I, JAMES F. SWINNERTON, a citizen of the United States, and a resident of the borough of Brooklyn, New York city, in the county of Kings and State of New York, have invented certain new and useful Improvements in Washers for Gases, of which the following is a specification.

My invention relates to washers for gases, and is especially useful with acetylene-gas generators. This form of washer was substantially shown, described, and claimed in my application for Letters Patent Serial No. 701,366, filed January 6, 1899, but was required by the Patent Office to be divided out of the said application. The present application is intended as a division of the former.

Figure 1:
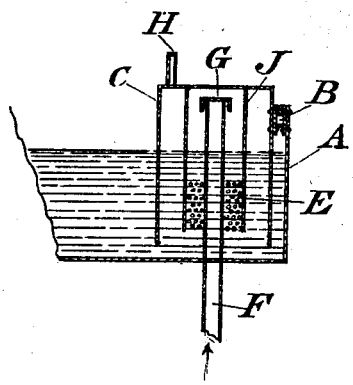
Figure 2:
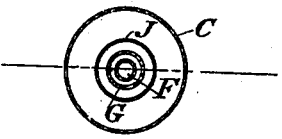

In the drawings forming part of this specification, Figure 1 is a vertical central section. Fig. 2 is a horizontal section taken at the top of pipe F.

A is a tank of any form containing water and in the application referred to would represent the tank above the generating-cylinders. In this tank by any suitable means, such as bracket B, is secured a cylinder C. This cylinder is closed at the top and open at the bottom and extends down into the tank near to the bottom thereof. Attached to the top of this cylinder is a tube J, which has at its lower end perforations E. Extending up through the bottom of the tank and inside of the tube J is a pipe F, which leads from the generator. This pipe extends up to near the top of the cylinder C and above the water-level in the tank A. On top of said pipe F is a loose cap G of any suitable construction. The tank A is filled with water up to the line indicated in the drawings.

The operation of the device is as follows: The gas generated rising through the pipe F will by its pressure raise the cap G and accumulate in the top of the tube J. The pressure of the gas will drive down the water in the tube J to and below the level of the perforations E. The gas issues through these perforations in fine globules and passes up through the water in the cylinder C and is drawn off through the pipe H to the gasometer or to the burners. By this simple washer the gas is thoroughly and effectively cleansed and purified.

While I have described this construction as being used with the form of generator shown in the former application referred to, it will be understood that the same may be used in any place or with any apparatus in which gas-washers are necessary.

What I claim, and desire to secure by Letters Patent, is—

1. A gas-washer consisting of a receptacle containing water, a cylinder closed at the top and open at the bottom extending below the level of said water, a tube attached to the top of said cylinder and extending down to near the bottom thereof, the lower part of the sides of said tube being provided with perforations, a gas-inlet tube extending into the said last-mentioned tube to near the top thereof, and a gas-outlet from said washer, substantially as described.

2. A gas-washer consisting of a receptacle containing water, a cylinder closed at the top and open at the bottom and extending below the level of said water, a tube attached to the top of said cylinder and extending down to near the bottom thereof, the lower part of the sides of said tube being provided with perforations, a gas-inlet tube extending into the said first-mentioned tube to near the top thereof, and a loose cap on top of said inlet-tube, and a gas-outlet from said washer, substantially as described.

Signed at New York, in the county of New York and State of New York, this 9th day of June, 1900.

JAMES F. SWINNERTON.

Witnesses:
HERBERT J. LILLIE,
LOUIS N. WHEALTON.